Figure 1:
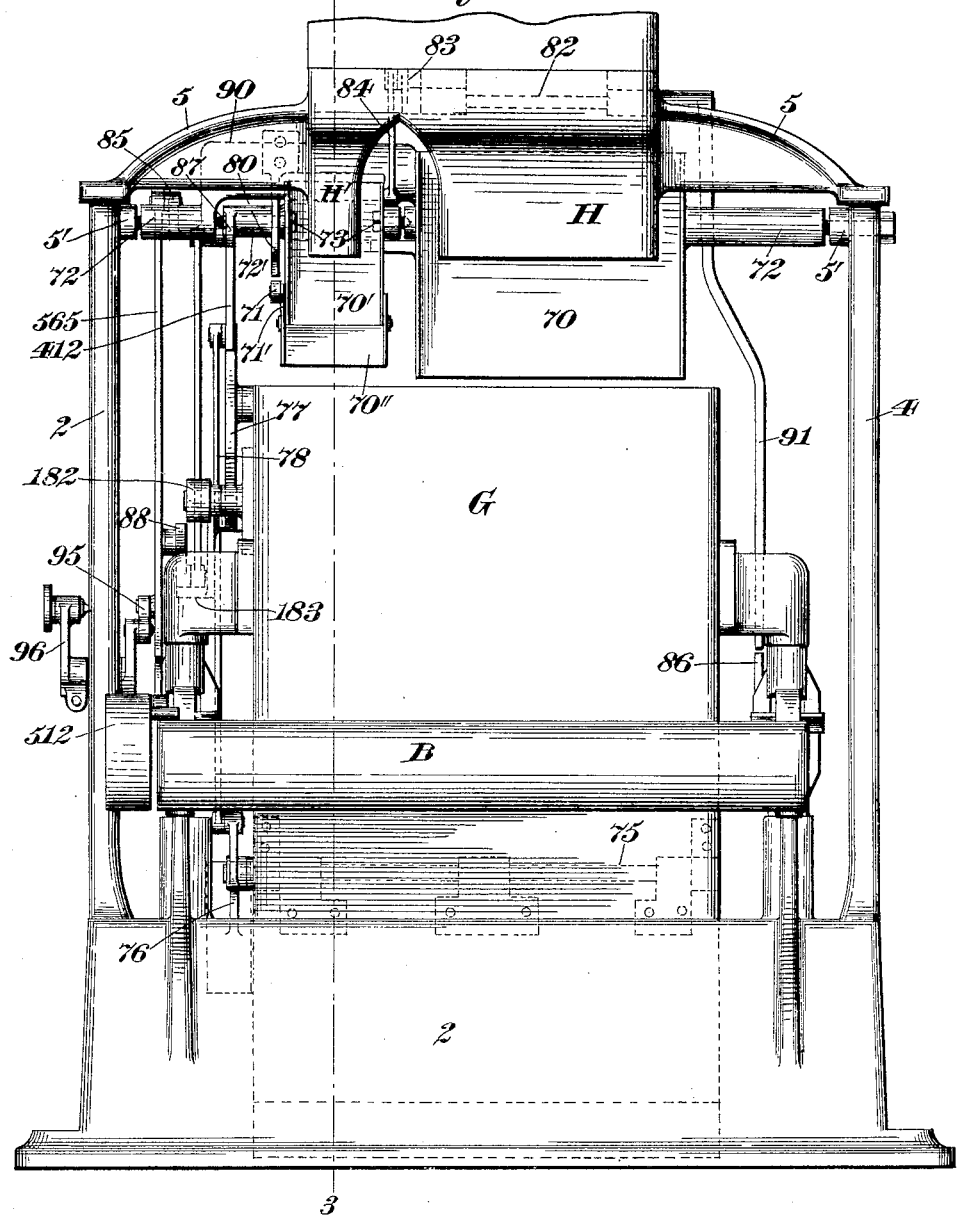

(No Model.)

F. H. RICHARDS.
WEIGHING MACHINE.

No. 578,166.

5 Sheets—Sheet 1.

Patented Mar. 2, 1897.

Witnesses
Chas. F. Schmelz
Fred. J. Dole.

Inventor
F. H. Richards.

(No Model.)　　　　F. H. RICHARDS.　　　5 Sheets—Sheet 3.
WEIGHING MACHINE.

No. 578,166.　　　　　　　　Patented Mar. 2, 1897.

Witnesses　　　　　　　　　　　　　　Inventor
Chas. O. Schmelz　　　　　　　　　　F. H. Richards
Fred. J. Dole.

(No Model.)

F. H. RICHARDS.
WEIGHING MACHINE.

No. 578,166.  Patented Mar. 2, 1897.

Witnesses
Chas. R. Schmelz
Fred. J. Dole.

Inventor
F. H. Richards.

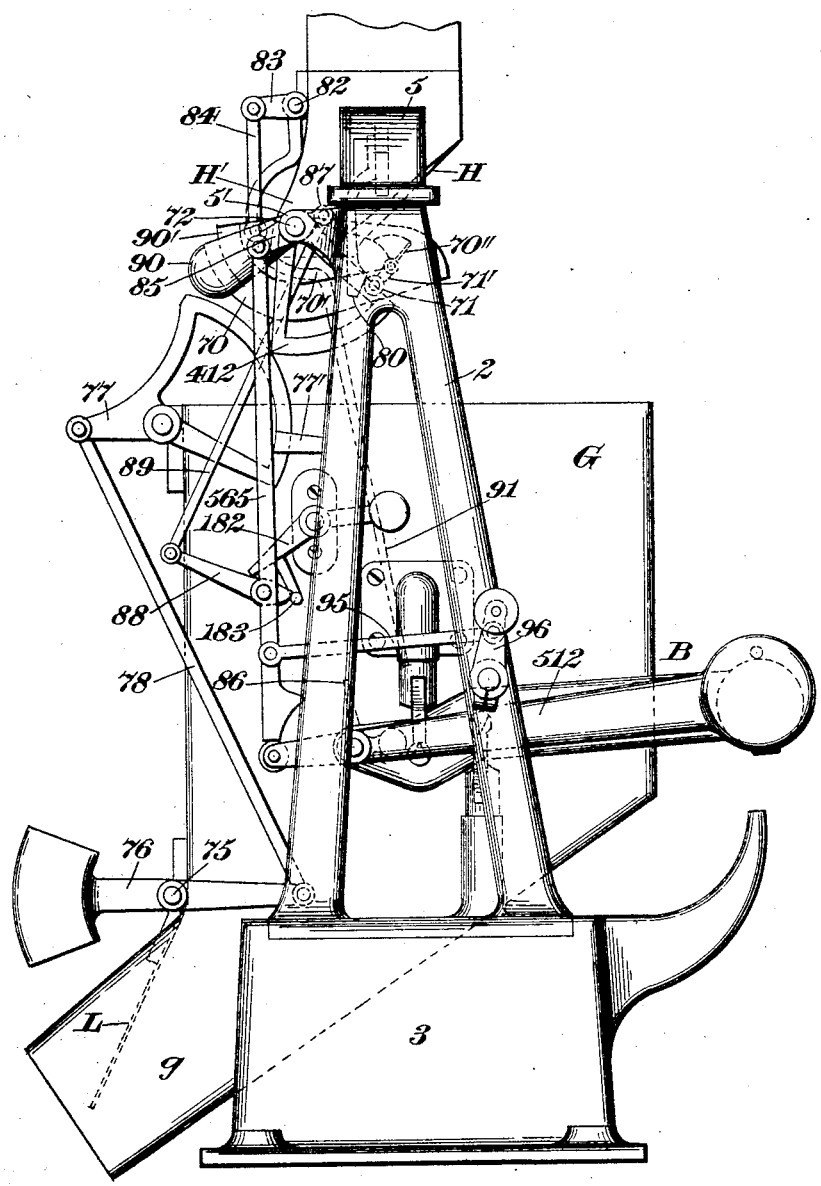

UNITED STATES PATENT OFFICE.

FRANCIS H. RICHARDS, OF HARTFORD, CONNECTICUT.

WEIGHING-MACHINE.

SPECIFICATION forming part of Letters Patent No. 578,166, dated March 2, 1897.

Application filed November 24, 1896. Serial No. 613,257. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, and especially to "automatic" weighing-machines of that class adapted for weighing predetermined quantities of granular or other material; and it has for its main object the provision of improved valve mechanism for controlling the supply of material to the usual load-receiver or bucket of the weighing mechanism and improved means for releasing the load-discharger or bucket-latch by the combined action of different parts of the valve mechanism.

As to one of the main features thereof this invention is in the nature of an improvement upon those shown and described in my prior patents, Nos. 559,213 and 559,214, granted April 28, 1896, the main feature of this portion of my present improvements being the provision of a pair of stream-controlling valves disposed side by side, one supported by the other, the preferred organization being one in which a main oscillatory valve carries side by side therewith an auxiliary valve having its axis of oscillation coincident with that of the main valve.

Although the main feature of the valve mechanism is the employment of a pair of valves disposed side by side, one supported by the other, yet in the preferred organization thereof herein illustrated I make use of a pair of auxiliary valves carried by a main valve in such a manner that while both are supported by such main valve only one of them is directly mounted thereon, one of the auxiliary valves being in the nature of a cut-off valve supported, preferably, for oscillation at the forward end of the other auxiliary valve and having its axis of oscillation parallel with the common axis of movement of the main valve and the principal auxiliary valve. Means are also provided for closing the main valve in advance of the closing movement of the auxiliary valves and for subsequently closing the latter to shut off the supply of material flowing into the bucket.

As to another of the features of my present invention I employ, in connection with suitable valve mechanism of a weighing-machine—such, for instance, as that hereinbefore particularly referred to—a load-discharger or bucket-latch and a load-discharge tripper, the latter of which is operative from different points in or parts of the valve mechanism and preferably from opposite sides of the axis of movement of such mechanism—in this case from opposite sides of the common axis of movement of the main valve and the principal auxiliary valve. Moreover, as the main valve closes in advance of the auxiliary valves I prefer to so organize the valve mechanism and the tripper that the latter may move with the main valve and have a movement therewith during the closure thereof, but will not operate to trip the load-discharger or bucket-latch until it has been operated by one of the auxiliary valves, the tripper being in the present instance operated from one side of the axis of movement of one valve and from the opposite side of the axis of movement of the other valve, so as to have a multiplied tripping movement for releasing the load-discharger or bucket-latch at the moment when the load in the bucket is completed and the latter is overpoised.

Figure 2:
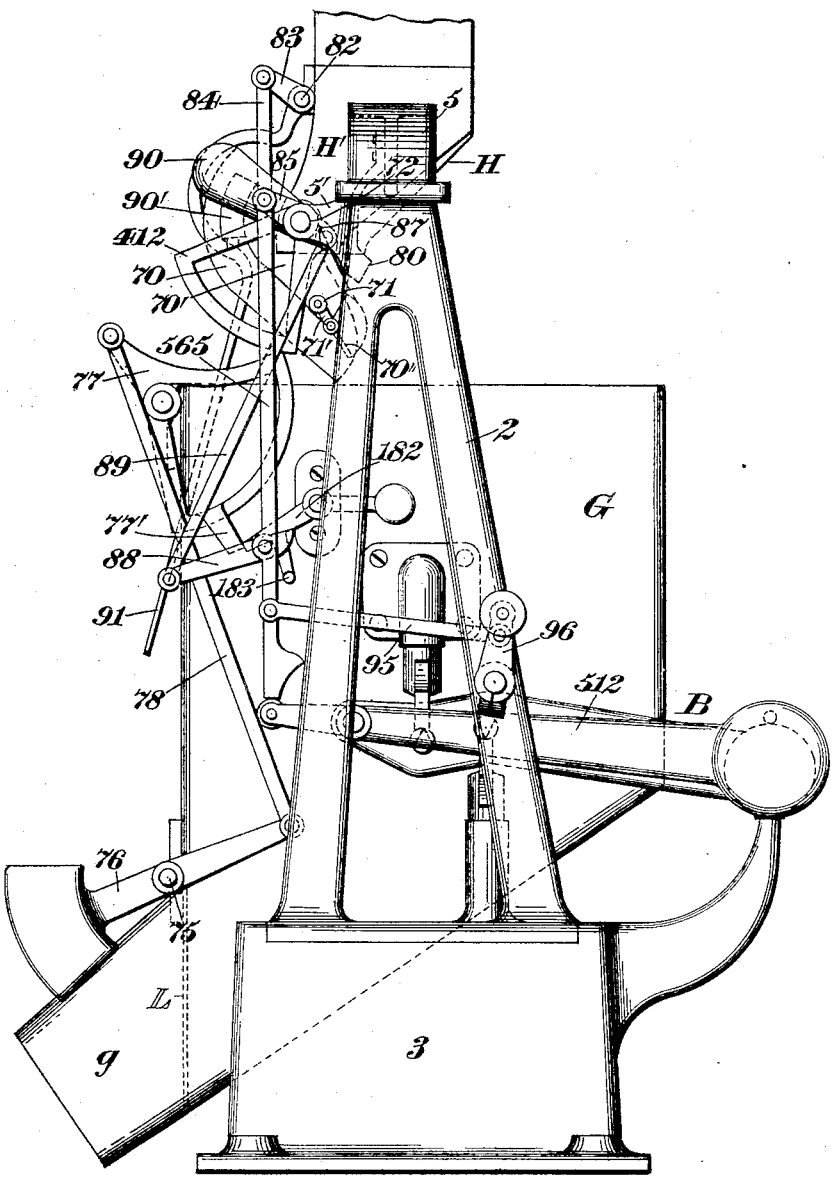
Figure 3:
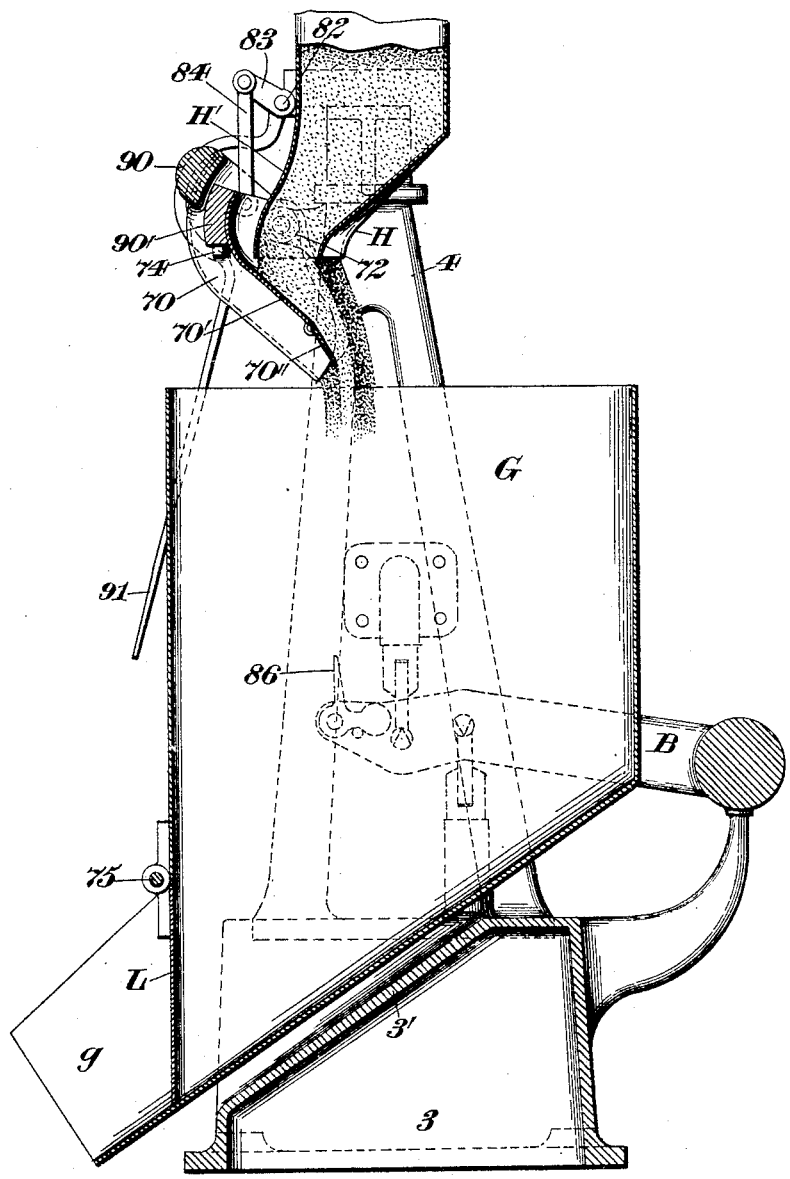
Figure 4:
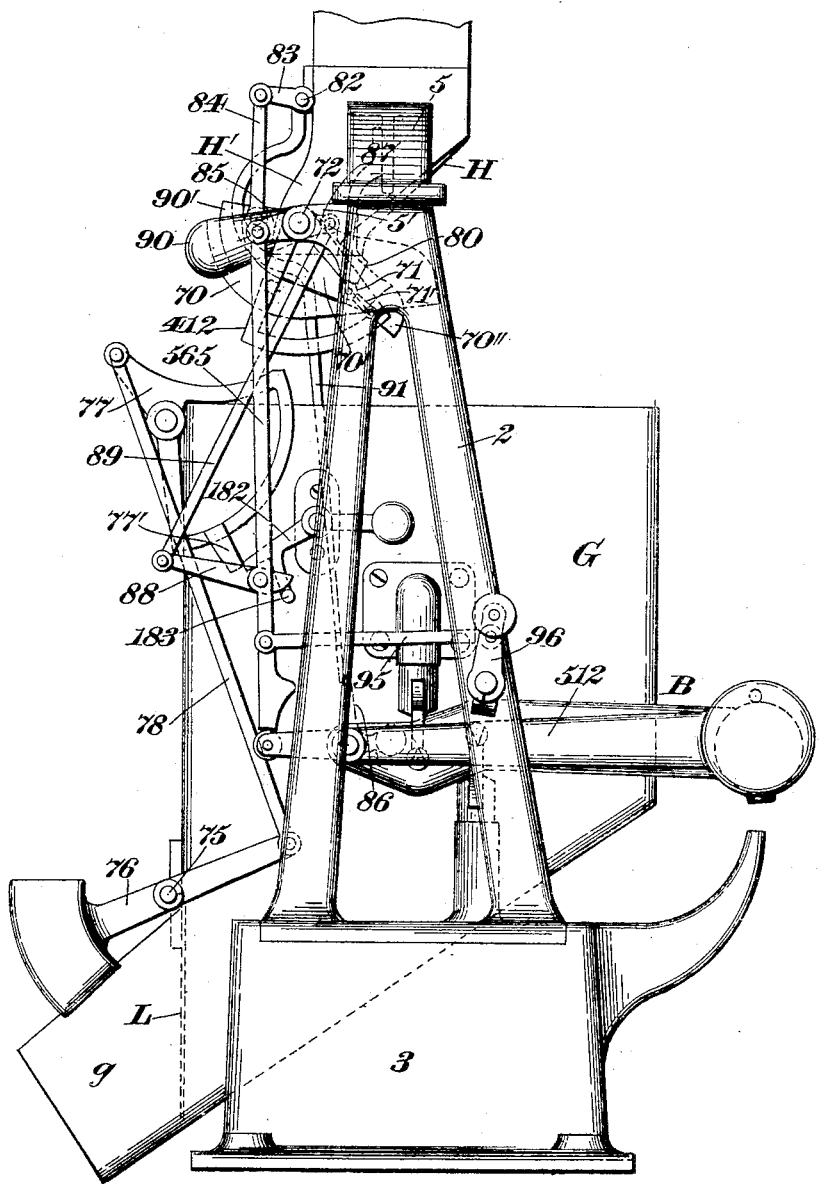

In the drawings accompanying and forming part of this specification, Figure 1 is a front elevation of a weighing-machine constructed in accordance with my present improvements. Fig. 2 is a side elevation of the same, looking from the left-hand side in Fig. 1 and illustrating the valves wide open. Fig. 3 is a vertical section of the same, the section being taken in line 3 3, Fig. 1, also illustrating the valves wide open. Fig. 4 is a side elevation of the machine, showing the valves in the drip position; and Fig. 5 is a similar view illustrating the positions of the parts when the load is completed, the valves are closed, and the closer open.

Similar characters designate like parts in all the figures of the drawings.

The framework for supporting the several operative parts of my improved weighing-machine is of a well-known type, and it comprises a base 3, carrying uprights or side frames 2 and 4, which are connected at their upper ends by a top plate or cross-beam 5, on which is supported a pair of supply spouts or chutes, one of which is designated by H and constitutes the main supply-spout for delivering the principal portion of each bucket-load into the receiver, while the other, which is designated by H', is an auxiliary supply-spout and is intended to supply the last portion of the load to the receiver after the flow of the stream from the chute H has been cut off. The bucket which I employ in this case is designated in a general way by G and has an inclined bottom wall forming one side of a delivery-spout $g$, extending toward the rear of the machine, the bottom wall of the bucket and of this spout being so positioned as to be adjacent to an inclined wall 3' of the base 3 of the machine when the bucket is in its lowermost position.

For the purpose of controlling the discharge of the bucket-load and for maintaining the bucket closed while the load is being made up therein I employ a closer, (designated in a general way by L,) which is mounted on the bucket so as to oscillate within the delivery-spout $g$, this closer being supported by a shaft 75 (see Figs. 1 and 3) at the rear end of the bucket and on the outside thereof, the closer being operated to close the same by a counterweighted lever 76, fixed on the shaft 75 and having its forward end pivotally connected with a rocker or valve-opening-movement limiter 77, supported for oscillation at the top of the bucket, the connection between the rocker and the lever 76 being effected by a connecting-rod 78.

The bucket G is supported in the present case on the poising sides of the beam-arms of a beam mechanism B by means of the usual knife-edge bearings, the beam mechanism being also supported in a similar manner on the base 3 by similar knife-edges.

The valve mechanism which I have illustrated in the drawings of this application comprises as its essential elements, as hereinbefore stated, a pair of valves disposed side by side, one carried by the other.

By reference to the drawings it will be seen that the stream of material flowing from the main supply spout or chute H is controlled by a main valve 70, having a valve-shaft 72, the opposite ends of which are pivotally supported by brackets 5', projecting from the extreme ends of the beam 5. At the left-hand side of the valve 70, as seen in Fig. 1, the shaft 72 has an offset or crank portion out of the line with said shaft and forming a valve-closing actuator for the valve 70, and this offset portion is so positioned as to form a space in which an auxiliary valve (designated by 70') may work.

The auxiliary valve 70' is preferably supported by the main valve in such a manner as to have its axis of oscillation coincident with that of such main valve, the smaller valve being provided in the present case with pivot-screws 73, the pivots of which are seated in corresponding bearings formed in the inner ends of the two sections of the main-valve shaft 72, the shaft of the valve 70' being indicated herein by 72'. This small valve also has a counterweight or closing-actuator, which is represented at 90', a suitable stop, such as 74, on the main valve being properly positioned for supporting the valve 70' on the large valve and limiting the closing movement of the smaller valve by that of the larger, while on the opening of the valves the stop also serves to carry the small valve with it, thus dispensing with the use of an independent actuator for said auxiliary valve.

The valve 70 is especially designed and intended to control the flow of the major portion of the material delivered to the bucket during the first part of the operation of making up the load, while the valve 70' will permit the delivery of material to the bucket at the same time that the main valve is open and will also control the flow of the drip-stream supplied to the bucket after the main valve is closed.

For the purpose of cutting off the drip-stream quickly when the bucket reaches the overpoising-line I prefer to make use of a third valve, such as 70'', which constitutes a second auxiliary valve or cut-off valve, and is supported for oscillation at the forward end of the valve 70', all three of these valves having their discharge edges facing in the same direction. The actuator for this third valve will preferably be a cam-arm, such as 80, depending from the top plate 5 of the machine and in position to engage an antifriction-roll 71 at the rear end of a rock-arm 71', secured to the valve 70'' and in fixed relation with the axis of movement thereof.

For actuating the valves to open the same I make use of the usual counterweighted lever 512, supported on one of the scale-beams of the beam mechanism and having its inner end in position to engage the lower end of a thrust-rod, such as 565, the upper end of which is pivotally connected with a rock-arm 85, fixed to the main-valve shaft 72, so that when the lever 512 becomes operative to open the main valve both of the auxiliary valves are actuated at the same time, owing to the engagement of the stop 74 against the underside of the counterweight 90' of the valve 70'.

In order to control the delivery of the drip-stream into the receiver for making up the last part of the load after the major portion thereof has been supplied, it is customary to employ a drip-lever movable with the valve mechanism and adapted to engage a stop on the beam mechanism during the poising period, and these devices are also shown in the drawings of my present application; but the drip-lever is not in this case carried by and movable with the main valve, but instead is entirely independent of the main valve and does not control the operation thereof, said valve being intended to close and its movements being so proportioned that it will close at the beginning of the drip period and cut off entirely the stream delivered from the supply-spout H. This drip-lever, which is designated by 91, is fixed in the present instance on a rock-shaft 82, supported in bearings on the rear wall of the supply spout or spouts, (see Figs. 1 and 2,) a rock-arm 83 being also fixed to this shaft and connected by means of a link 84 with the valve 70', so that while the drip-lever is movable with and operated by the valve 70' it is not supported on said valve and, moreover, does not control in any way the movements of the main valve, it being intended to hold the valve 70' open during the drip period and after the main valve has closed.

In order to prevent the opening of the closer L while the valves are open, I make use of the usual stop or load-discharging-movement limiter 412 in the form of a segment fixed on the shaft 72' of the auxiliary valve 70', it being obvious by reference to Fig. 5 that when the main valve and the auxiliary valves are closed the coöperative stop 77 on the bucket will block the opening movement of the valve 70', and hence will block the opening of the main valve, as the counterweight 90' by engaging the stop 74 positively holds the main valve against opening until the valve 70' is opened.

For the purpose of releasing the stop-segment 77 and permitting the opening of the closer L, I make use of a load-discharger or bucket-latch, such as 182, adapted to engage in the usual manner a stop-arm 77', projecting from the segment 77. This latch is intended to be released by means of a suitable tripper, which will coöperate with a stop 183, projecting from the main portion or body of the latch.

In various patents heretofore granted to me I have illustrated a valve-operated actuator for releasing the load-discharger or latch, this actuator being usually in the form of a tripper carried by a thrust-rod similar to that shown at 565 and operative on the closing of the valve as the inner end of the counterweight 512 descends and permits the descent of said thrust-rod.

In my present application the tripper or actuator is also mounted on this thrust-rod; but, while it is movable bodily therewith on the descent of the rod, it is also intended in this case to have a multiplied movement during the descent of said rod for the purpose of increasing the effective movement of the tripper and rendering its operation more positive and certain. This tripper is represented herein at 88 and is in the form of a lever pivoted on the thrust-rod 565 and having a short arm at its forward end preferably shaped so as to present a cam-face to the stop 183 when in engagement with the latter, while the long rear arm of the lever is connected in this instance with the auxiliary valve 70'.

It will be noticed that while the load-discharger tripper 88 is operatively connected with both the main valve 70 and the auxiliary valve 70' it is connected to the main valve in the rear of the axis of oscillation thereof, while its connection with the smaller valve 70' is at a point in advance of such axis of movement, the result of this organization of the parts being to cause the pivot of the tripper to move with the thrust-rod 565 on the closing of the main valve, while when the valve 70' is closed said tripper will be oscillated about said pivot on the thrust-rod, and its rear end will be drawn up, thus forcing its forward end down and imparting to the same a multiplied tripping movement, effective for instantly releasing the load-discharger or bucket-latch. The connection of the rear end of the tripper to the auxiliary valve 70' is obtained in the present case by means of a suitable rod 89, pivoted to said tripper, at the rear end thereof, and also to a rock-arm 87, projecting forward from the shaft 72'. (See Fig. 1.) Thus while the tripper is adapted to move bodily in unison with the descent of the scale-beam by reason of its connection with the thrust-rod 565 it also has a relatively rapid tripping movement as compared with the descent of said beam.

When it is desired to prevent the discharge of the load made up in the bucket and to test the accuracy of the same, I may make use of the usual testing devices illustrated in my prior patents, a link being represented herein at 95 in position to connect the thrust-rod 565 and a crank or handle 96 on the side frame 2 of the machine for throwing the lower end of said thrust-rod out of operative relation with the antifriction-roll on the counter-weighted lever 512.

The operation of a weighing-machine constructed in accordance with my present improvements is as follows: It being understood that the valves are wide open and delivering material into the bucket from the two supply-spouts H and H', as illustrated in Figs. 2 and 3, that the closer is shut, and that the stop 412 is in position to block the oscillation of the rocker or stop segment 77 and thereby prevent the opening of the closer, it will be seen that after the major portion of the load has been made up by the delivery of material to the bucket from both supply-spouts simultaneously the bucket will descend, and the counterweight 90 will become effective to carry the main valve 70 to its shut position (shown in Fig. 4) before the beginning of the drip period, owing to the fact that the drip-lever 81 does not control the closing movement of the main valve and that the latter is permitted to shut as soon as the scale-beam has been carried down to the position shown in said figure.

During the closing of the main valve and before the beginning of the drip period the valve 70' is free to turn slightly about its axis from the position shown in Fig. 3 to that represented in Fig. 4, in the latter of which it will be stopped by the engagement of the lower end of the drip-lever against the by-pass stop 86 on the scale-beam, so that while the main valve is continuing its closing movement to the position shown in Fig. 4 the valve 70' is held in the position illustrated in said figure and remains in that position throughout the drip period and until the drip-lever is released from the stop 86, whereupon the counterweight 90 becomes effective to oscillate the valve 70' to the position shown in Fig. 5, and the cam-face of the arm 80, depending from the beam 5, being engaged by the antifriction-roller 71' on the cut-off valve 70", causes the oscillation of said cut-off valve relatively to the valve 70' to the position indicated in Fig. 5, thus shutting off the flow of material from the supply-spout H'.

By the closing of the main valve 70 the tripper 88 was carried down to a point where the cam-face of its short arm was adjacent to the stop 183, but not sufficiently near to trip the bucket-latch. On the closing of the auxiliary valve, however, the rear end of the tripper 88 is drawn up quickly, and a multiplied tripping movement, due to the continued downward movement of the tripper with the thrust-rod and to the oscillation of the tripper about its pivot on the thrust-rod, is imparted to the forward end of the lever 88 to release the bucket-latch from the stop 77'.

As soon as this occurs the stop 412 is withdrawn from engagement with the stop 77, and thereupon the force of the material in the bucket carries the closer L to its open position in the direction shown in Fig. 5, and the stop 77 is then effective to block the return of the stop 412, and hence to prevent the opening of either the main valve 70 or the auxiliary valve 70' until the closer is shut by the action of the counterweighted lever 76.

After all of the material has been delivered through the spout $g$ the closer is shut, the stop 77 is withdrawn from the stop 412, and the counterweighted lever 512, which, on the ascent of the bucket after discharging a portion of its load, was oscillated relatively to the beam mechanism, becomes effective to carry the main valve to its open position and therewith the two auxiliary valves.

Having described my invention, I claim—

1. The combination, with stream-supplying means; of a pair of stream-controlling valves disposed side by side, one supported by the other; and means for actuating said valves.

2. The combination, with stream-supplying means; of a pair of oscillatory stream-controlling valves disposed side by side, one supported by the other; and means for actuating said valves.

3. The combination, with stream-supplying means; of a pair of oscillatory stream-controlling valves disposed side by side, one supported by the other, and having their axes of movement coincident; and means for actuating said valves.

4. The combination, with stream-supplying means; of a pair of stream-controlling valves disposed side by side, one supported at its opposite sides by the other; and means for actuating said valves.

5. The combination, with stream-supplying means; of a pair of oscillatory stream-controlling valves disposed side by side, one pivotally supported at its opposite sides by the other; and means for actuating said valves.

6. The combination, with stream-supplying means, of a main valve; a pair of auxiliary valves carried by said main valve; and means for actuating said valves.

7. The combination, with stream-supplying means, of a main valve; an auxiliary valve carried by the main valve; a cut-off valve carried by said auxiliary valve; and means for actuating said valves.

8. The combination, with stream-supplying means, of a pair of stream-controlling valves disposed side by side, one supported by the other; a cut-off valve carried by one of said first-mentioned valves; and means for actuating said valves.

9. The combination, with stream-supplying means; of an oscillatory main valve and an oscillatory auxiliary valve disposed side by side, the latter carried by the former; a cut-off valve carried by said auxiliary valve; and means for actuating said valves.

10. The combination, with stream-supplying means; of an oscillatory main valve and an oscillatory auxiliary valve disposed side by side, the latter carried by the former, and having their axes of movement coincident; a cut-off valve carried at the forward end of said auxiliary valve; and means for actuating said valves.

11. The combination, with stream-supplying means; of an oscillatory main valve and an oscillatory auxiliary valve disposed side by side, the latter carried by the former, and having their axes of movement coincident; an oscillatory cut-off valve carried at the forward end of said auxiliary valve; and means for actuating said valves.

12. The combination, with stream-supplying means; of a main valve; a pair of auxiliary valves carried by said main valve; means for closing the main valve; and means for subsequently closing the auxiliary valves.

13. The combination, with stream-supplying means; of a main valve; an auxiliary valve carried by the main valve; a cut-off valve carried by said auxiliary valve; means for successively closing the main valve and the auxiliary valve; and means for closing the cut-off valve relatively to the auxiliary valve.

14. In a weighing-machine, the combination, with stream-supplying means, of a stream-controlling valve; valve-actuating means; a valve-operated drip-lever supported independently of the valve and adapted to stop the same; and means for holding said drip-lever against movement during the drip period.

15. In a weighing-machine, the combination, with stream-supplying means, of an oscillatory stream-controlling valve; valve-actuating means; a valve-operated rock-shaft supported independently of the valve; a valve-stopping drip-lever secured to said rock-shaft; and means for holding said drip-lever against movement during the drip period.

16. The combination, with stream-supplying means and with a load-discharger; of a main valve and an auxiliary valve disposed side by side, the latter carried by the former; means for actuating said valves; and alternately-effective valve-opening-movement and load-discharging-movement limiters.

17. The combination, with stream-supplying means and with a load-discharger; of a main valve and an auxiliary valve disposed side by side, the latter carried by the former; means for actuating said valves; and alternately-effective valve-opening-movement and load-discharging-movement limiters, the former operative with the load-discharger, for limiting the opening movement of the valves, and the latter operative with the auxiliary valve, for limiting the discharging movement of the load-discharger.

18. The combination, in a weighing-machine, with stream-supplying means and with valve mechanism, of weighing mechanism embodying a load-discharger; and a load-discharger tripper operative from different parts of the valve mechanism.

19. The combination, with stream-supplying means and with oscillatory valve mechanism, of weighing mechanism embodying a load-discharger; and a load-discharger tripper operative from opposite sides of the axis of the valve mechanism.

20. The combination, in a weighing-machine, with stream-supplying means and with a pair of stream-controlling valves, of weighing mechanism embodying a load-discharger; and a load-discharger tripper in operative relation with both of said valves.

21. The combination, in a weighing-machine, with stream-supplying means and with a pair of stream-controlling valves, of weighing mechanism embodying a load-discharger; and a load-discharger tripper operatively connected with both of said valves.

22. The combination, in a weighing-machine, with stream-supplying means and with a pair of stream-controlling valves, of weighing mechanism embodying a load-discharger; and a load-discharger tripper carried and operative by both of said valves.

23. The combination, in a weighing-machine, with stream-supplying means and with a pair of stream-controlling valves, of weighing mechanism embodying a load-discharger; and a load-discharger tripper operative by one of said valves and having a multiplied tripping movement from the other.

24. The combination, in a weighing-machine, with stream-supplying means and with a pair of stream-controlling valves, of weighing mechanism embodying a load-discharger; and a load-discharger tripper operative by one of said valves and having an oscillatory multiplied movement from the other.

25. The combination, with stream-supplying means and with a pair of oscillatory stream-controlling valves, of weighing mechanism embodying a load-discharger; a load-discharger tripper; and operating connections to said tripper from one side of the axis of one valve and from the opposite side of the axis of the other valve.

26. The combination, with stream-supplying means and with a pair of oscillatory stream-controlling valves facing in the same direction and having a common axis of movement, of weighing mechanism embodying a load-discharger; a load-discharger tripper; and operating connections to said tripper from opposite sides of the axis of movement of said respective valves.

27. The combination, in a weighing-machine, with stream-supplying means and with a pair of stream-controlling valves; of weighing mechanism embodying a scale-beam, a bucket, and a bucket-latch; and a valve-operated latch-tripper movable bodily in unison with the descent of the scale-beam and having a relatively rapid tripping movement as compared with the descent of said beam.

28. The combination, with stream-supplying means and with a pair of stream-controlling valves facing in the same direction and having a common axis of movement; of weighing mechanism embodying a scale-beam, a bucket, and a bucket-latch; a thrust-rod pivotally connected to one of said valves, in the rear of the axis of movement thereof, and having its lower end in operative relation with the scale-beam; a latch-tripper pivotally supported on said thrust-rod and having one end thereof in position to trip the bucket-latch; and connections between the other end of said latch-tripper and the opposite side of the other valve, for imparting a multiplied tripping movement to the latch-tripper.

FRANCIS H. RICHARDS.

Witnesses:
FRED. J. DOLE,
HENRY BISSELL.